Patented Oct. 25, 1932

1,885,100

UNITED STATES PATENT OFFICE

REGINALD H. ROBINSON, OF CORVALLIS, OREGON, DEDICATED, BY MESNE ASSIGNMENTS, TO THE CITIZENS OF THE UNITED STATES

PROCESS FOR THE REMOVAL OF SPRAY RESIDUES FROM FRUITS AND VEGETABLES

No Drawing.  Application filed July 11, 1929. Serial No. 377,588.

(GRANTED UNDER THE ACT OF MARCH 3, 1883, AS AMENDED APRIL 30, 1928; 370 O. G. 757)

This application is made under the act of March 3, 1883, Chapter 143, (22 Stat. 625) as amended April 30, 1928 (H. R. 6103) and in accordance therewith applicant states, that the invention described herein, if patented, may be manufactured and used by or for the Government for governmental purposes without the payment to him of any royalty thereon, or by any other persons in the United States, without payment to him of any royalty thereon.

This invention relates to the use of certain combinations of chemicals to remove or dissolve certain spray residues from deciduous fruits and from vegetables.

The agent used for the removal of spray residue is a mixture of a water solution of hydrochloric acid and certain sulfates, such as sodium sulfate, copper sulfate, or iron sulfate. It has been found by experimentation that when comparatively small amounts of certain sulfates are dissolved in a weak water solution of hydrochloric acid that the solvent action of the latter on spray residue is increased materially.

The spray residues in question are such deposits of arsenic, lead, copper, manganese, calcium, etc., that remain on fruit or vegetables from the applications of such spray materials as arsenate of lead, arsenate of calcium, bordeaux mixture, calcium hydroxide, etc.

The deciduous fruits referred to are apples, pears, plums, prunes, peaches, apricots, quinces, nectarines, cherries, grapes, currents, gooseberries, raspberries, strawberries, blackberries, etc. The vegetables include beans, celery, greens such as spinach, chard, etc., peas, lettuce, tomatoes, etc.

The removal of the spray residue is made effective by washing the fruit or vegetables in a suitable washing apparatus with a water solution of a mixture of hydrochloric acid and certain sulfates, used at such concentrations as will be effective. For most purposes concentrations of combinations of from 0.1 to 1.0 per cent hydrochloric acid (HCl) and 0.25 to 2.0 per cent of sulfates are optimum. The length of treatment for the removal of the residue depends upon such factors as (1) the temperature of the solution, (2) the amount of agitation given if the solution is used in a flotation type washing machine, (3) the concentration of the cleaning solution, (4) the amount and nature of the residue present, (5) the amount of wax or oil that may be on the fruit at the time of treatment. After treatment in this cleaning solution the fruit or vegetables are rinsed by washing with water to remove the cleaning solution and then dried by natural or artificial means.

I claim:—

1. A process for the removal of spray residue from fruit and vegetables comprising the application to the fruit or vegetables of a water solution of a mixture of hydrochloric acid and ferrous sulfate, (copperas) followed by washing with water to remove the cleaning solution and then drying the fruit or vegetables.

2. An improved washing solution for fruit and vegetables comprising water, hydrochloric acid and iron sulphate.

REGINALD H. ROBINSON.